May 16, 1972　　　HARUO NITTA ET AL　　　3,663,682

ROTARY MOLDING METHOD

Filed Sept. 8, 1969

INVENTORS.
HARUO NITTA
NAOTOSHI SAGAWA

BY Sughrue, Rothwell, Mion, Zinn & Macpeak
ATTORNEYS.

United States Patent Office 3,663,682
Patented May 16, 1972

3,663,682
ROTARY MOLDING METHOD
Haruo Nitta and Naotoshi Sagawa, Yokkaichi-shi, Japan, assignors to Mitsubishi Petrochemical Co., Ltd., Tokyo, Japan
Filed Sept. 8, 1969, Ser. No. 855,872
Claims priority, application Japan, Sept. 18, 1968, 43/66,972
Int. Cl. B29c 5/04
U.S. Cl. 264—310                    5 Claims

ABSTRACT OF THE DISCLOSURE

An irregular rotary mold carries external cooling liquid retaining devices along peripheral areas which are normally difficult to cool. The retaining devices permit a uniform cooling of the synthetic resin article after melting the resin and forming the article.

BACKGROUND OF THE INVENTION

Field of the invention

The present invention relates to rotary molding of plastic articles and in particular to cooling the article.

DESCRIPTION OF THE PRIOR ART

In general, rotary molding comprises charging a powder synthetic resin of an amount necessary to form the desired article, into a mold cavity, rotating the metallic mold in a mono-axis direction under heat to melt the synthetic resin and to cause it to adhere onto the interior wall of the metallic mold, and, after cooling, removing the solidified article from the metallic mold.

In such molding methods not only is heating but also cooling very important for obtaining a good article, in particular, in the latter cooling step preferably the whole metallic mold is uniformly cooled.

As to the cooling step, in general, sprinkling or spraying a cooling liquid over the metallic mold while rotating the same has hitherto been employed. However, in either case, where the metallic mold has an angular structure, it is very difficult to uniformly cool the same and it often causes an inferiority in molding.

DESCRIPTION OF PREFERRED EMBODIMENT

Figure 5:
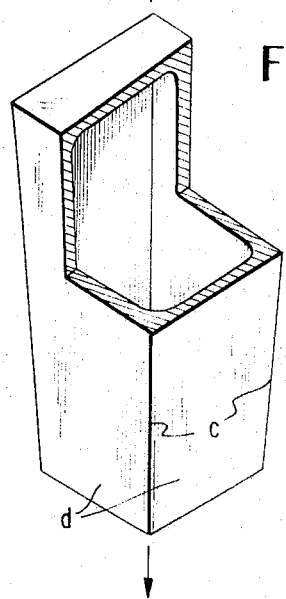

Illustrating the problem which the present invention solves is the case of making a regular hexahedral angular hollow vessel as in FIG. 5. It will be easily understood that, even in the case of cooling the metallic mold while rotating it in a mono-axis or bi-axis direction, the corner zone $c$ of the metallic mold needs a longer contact time with the cooling liquid than the plate zone $d$ as long as the metallic mold rotates at a constant velocity and the flow volume of cooling liquid is constant. The cooling liquid can be water which will hereinafter be described in the preferred embodiment.

In short, it can be seen that the zone $d$ constituting a flat plate or surface requires a far shorter cooling action time with the cooling water than the zone $c$ constituting the angular corner.

Therefore, the zone $c$ generally receives an inferior cooling effect in comparison with zone $d$.

Considering the amount of molding synthetic resin in the zones $c$ and $d$, the zone $d$ is thinner in comparison with the zone $c$ since the zone $d$ is flat and the zone $c$ is larger in resin volume since it comprises a corner. Therefore, the zone $c$ retains a greater amount of heat in comparison with the zone $d$.

Alternatively, the molten resin in the metallic mold is gradually cooled from the surface contacting the inside wall of the metallic mold and so, in particular, in the case of crystalline synthetic resin such as high density polyethylene resin, the surface of the article contacting the metallic mold and its opposite side of article are extremely different in solid structure. That is, the surface of the article opposite its surface in contact with the inside wall of metallic mold is gradually cooled and thereby its crystallization degree is elevated and its contraction is remarkably increased. Then, in the case of a molded article as shown in FIG. 5, first the zone $d$ is cooled and thereafter subjected to a deforming force in the axial direction of the metallic mold.

On the other hand, in such a case, the zone $c$ is still in an almost molten state because of the poor cooling effect and this results in a deformed article.

The present invention removes the lack of uniformity in cooling. The present invention provides a rotary molding method and apparatus in which the cooling action can be uniformly carried out by providing a water holding zone in such a place where the cooling water does not normally act as effectively, such as at the corner of the angular metallic mold.

The cooling apparatus, and the action and effect of the metallic mold of the present invention as well as its method is described below.

Figure 1:
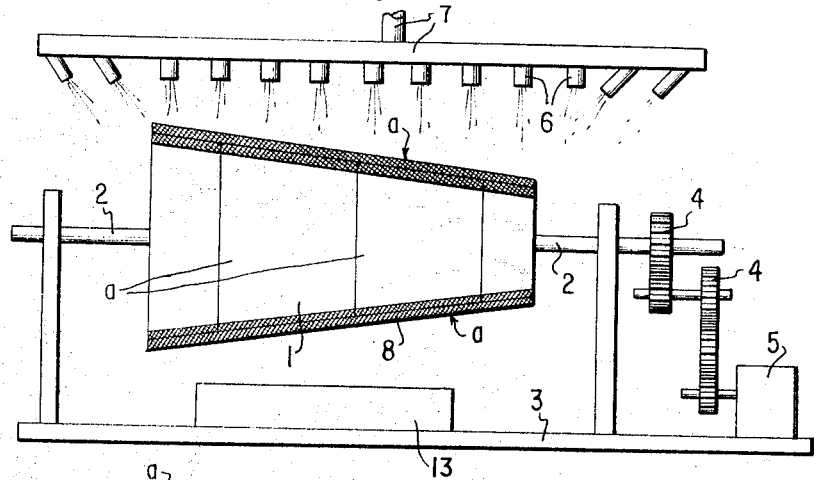
FIG. 1 is a side view partially in section showing an apparatus for cooling a metallic mold incorporating the present invention.
Figure 2:
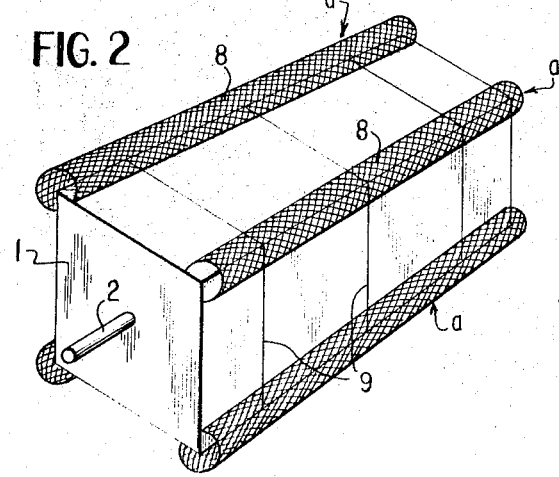
FIG. 2 is a perspective view of the metallic mold of FIG. 1.

First, FIG. 1 shows a hexahedral angular metallic mold 1, having an axis bilaterally projected from the metallic mold 1 and placed on a frame 3 in such a manner as capable of free rotation. A set of gears 4 are connected to one side of the axis 2 and arranged to be driven by motor 5 so that the rotational velocity of metallic mold can be reduced. A number of nozzle 6 provide cooling water from above the metallic mold 1 through pipe 7 carrying cooling water. The metallic mold 1 is provided with a water staying or retention zone $a$ composed of a metallic network 8 formed by a wire net of about 1 mm. in size, having configured openings 5 mm. square and extending along the edge of the metallic mold 1. In FIG. 2 wires 9 fix the metallic network 8 to the mold 1. The wires form a porous water retention means for holding the cooling water during rotation of the mold.

Figure 3:
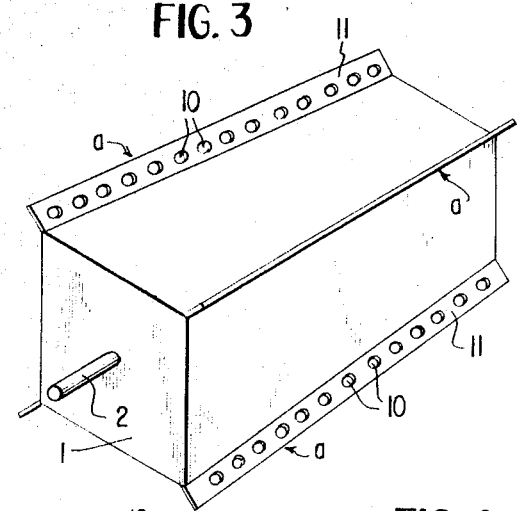
FIGS. 3 and 4 are perspective views showing other metallic molds incorporating the invention and FIG. 5 is a perspective view of an article obtained by the method of the present invention.
Figure 4:
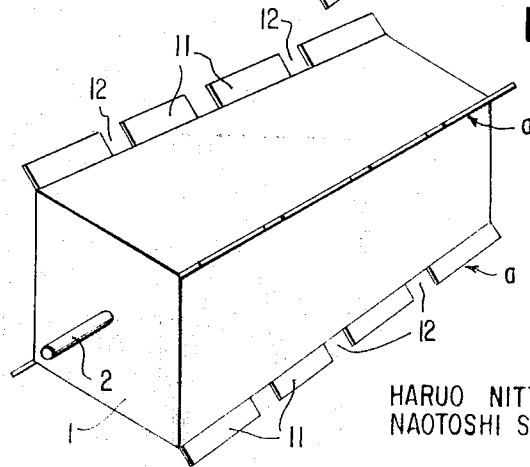

In FIG. 3, the water staying or retention zone $a$ is composed of a perforated plate 11 having a number of pores 10 in place of the metallic network 8. Further, in FIG. 4, the water retention zone $a$ is composed of a plate 11 having cutout portions 12.

In the present invention, when carrying out rotary molding by the metallic mold 1 and cooling with water, the metallic mold is rotated through the gear mechanism 4 by the motor 5 and the cooling water sprayed from the nozzles 6, the water flows down along the outer surface of metallic mold to cool it. The corner of the metallic mold 1 can be continuously and effectively cooled by the cooling water since, the edges have retention zones composed of either the metallic network 8, the perforated plates 11 or plates having cut portions 12. Thus, the process of the present invention can effect a uniform cooling of the whole metallic mold.

According to the present invention, the zones or areas of the metallic mold, which are difficult to be cooled, can be effectively cooled due to the improved and uniform cooling effect by establishing water staying zones in areas which are difficult to cool so that the cooling water is retained, and thus articles without deformation can be effectively and readily obtained.

Heating means 13 are used and can be of a conventional form.

In operation, a synthetic resin is charged into the mold cavity in a conventional manner. The cavity is closed and rotated while heat is provided to melt the resin. Subsequently, the mold 1 is cooled in a uniform manner by for example, regulating the speed for the mold 1 through the gears 4 and employing the water retention zone to compensate for the greater cooling necessary at the corners of the mold 1. When the article is sufficiently cooled it can be removed from the mold 1.

EXAMPLE 1

In FIGS. 1 and 2:

Thickness of metallic mold: approximate 2.2 mm.
Top of the smaller side of the metallic mold: 40 cm. square
Top of the larger side of the metallic mold: 45 cm. square
Metallic network: netted by a wire of 1 mm. in size with 5 mm. square openings, and 4 cm. in radius, and then established by loosely winding the same.
Resin used: low density polyethylene MI=4, specific gravity 0.928 30 to 100 meshes, powder. Amount charged: 8 kg.
Heating temperature: about 400° C. at the surface of metallic mold.
Heating time: 6 minutes
Cooling: by a shower as in FIG. 1, for 1.5 minutes.
Height of metallic mold: approximate 100 cm.

We claim:

1. A method for rotational molding synthetic resin to form an elongated article having flat surface is angular relationship to form corners and a polygonal cross section, comprising the steps of:
    placing synthetic resin powder in a mold having a cavity adapted to the external configuration of said article, said mold having heat conducting walls and liquid retention zones at the exterior corners of said mold,
    closing and heating said mold cavity to melt said resin powder while rotating said mold about a longitudinal axis to uniformly distribute said molten resin about said mold cavity walls,
    removing said heat from said mold by spraying cooling liquid upon the outer surface of said rotating mold to solidify said molten resin while said cooling liquid held in said retention zones provides effective cooling of said resin at said corners without deformation of the thus molded article during said cooling, and
    stopping said mold rotation and removing said molded article therefrom.

2. A method for rotational molding synthetic resin to form an article with a plurality of surfaces forming corner zones, comprising the steps of:
    placing synthetic resin powder in a mold having a cavity adapted to the external configuration of said article, said mold having heat conducting walls and porous liquid retention means at the exterior corner zones of said mold,
    closing and heating said mold cavity to melt said resin powder while rotating said mold about a longitudinal axis to uniformly distribute said molten resin about said mold cavity walls,
    removing said heat from said mold by spraying cooling liquid upon the outer surface of said rotating mold to solidify said molten resin while said cooling liquid held in said porous liquid retention means provides effective cooling of said resin at said corners without deformation of the molded article during said cooling, and
    stopping said mold rotation and removing said molded article therefrom.

3. The method as defined in claim 2, where the cooling liquid is water.

4. The method as defined in claim 2, where the porous liquid retention means are screens.

5. The method as defined in claim 4, where said synthetic resin is a low density polyethylene, said mold cavity is heated for approximately 6 minutes at a temperature of approximately 400° C. at its exterior surface and said cooling lasts approximately 1.5 minutes.

References Cited

UNITED STATES PATENTS

| 3,173,175 | 3/1965 | Lemelson | 264—310 |
| 3,316,339 | 4/1967 | Breneman | 264—310 |
| 3,520,353 | 7/1970 | Hoyle et al | 249—79 |

ROBERT F. WHITE, Primary Examiner

J. R. HALL, Assistant Examiner

U.S. Cl. X.R.

18—26 R, 39